Sept. 6, 1932.    C. E. MAYNARD    1,876,333
APPARATUS FOR VULCANIZING ANNULAR ARTICLES
Filed Aug. 3, 1927    3 Sheets-Sheet 1

INVENTOR.
Charles Edgar Maynard
BY
Edward C. Taylor
ATTORNEY.

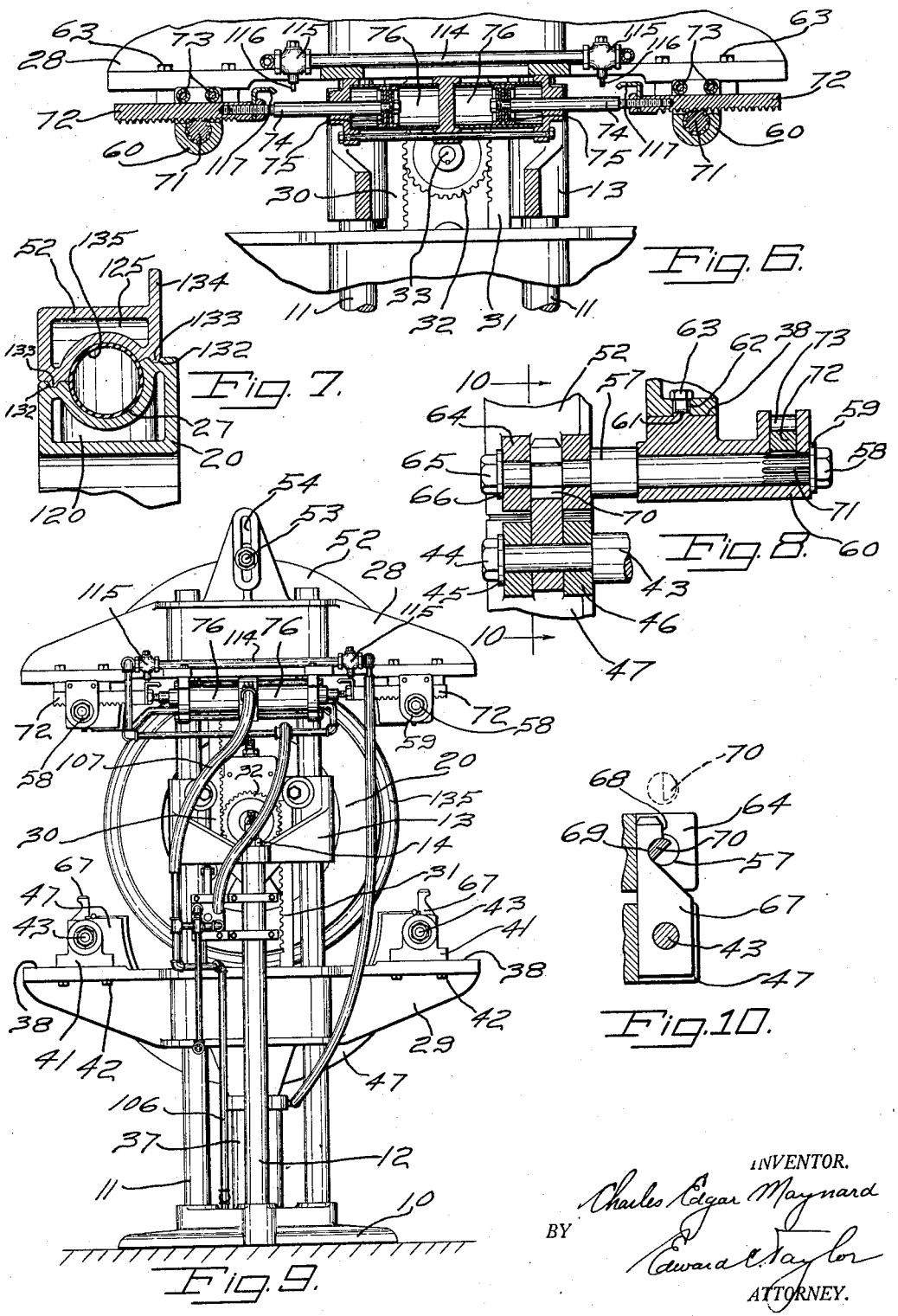

Patented Sept. 6, 1932

1,876,333

UNITED STATES PATENT OFFICE

CHARLES E. MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

APPARATUS FOR VULCANIZING ANNULAR ARTICLES

Application filed August 3, 1927. Serial No. 210,295.

In the manufacture of annular articles such, for example, as inner tubes for pneumatic tire casings recent commercial tendency is toward the use of so-called individual vulcanizers in which a mold, defining a single molding cavity, has a permanent mounting provided either merely with means for holding the mold locked or with such means and in addition mold opening and closing devices. In the commercial use of apparatus of this character it is very important that certain economic properties be developed to the highest degree possible. For example, since a single individual vulcanizer is handling but one article at a time it is desirable that the floor space required be kept at the minimum. Since all non-vulcanizing time is essentially non-productive it is necessary that the time for opening and closing the mold be kept low and that the mold should be freely accessible when open so that the operator shall not be delayed. In accommodating the use of an individual vulcanizer to fluctuations in schedules of production it is frequently necessary to change the size of the molding cavity. An economically successful mold must permit of the mold cavity defining walls being changed in a very short time and without removing from the machine any of the operating parts.

It is the object of my present invention to attain these ideals more closely than has been possible with any prior type of mold construction. I believe that my improved mold requires less floor space for a given size of mold cavity than any prior mold, that it is quicker in operation, and more accessible when open. Furthermore, my improved mold is readily interchangeable for different sizes of molding cavity, not only rapidly but without affecting the tightness of the steam jacket by which the mold is heated. A further object of my invention is to provide a mold which will register when closed irrespective of the accuracy of the alignment of the mold opening and closing devices. A further object of my invention is to improve the steam circulation in a mold of this general character so that the entire surface of the molding cavity will at all times maintain a uniform temperature both when the mold is opened and when it is closed. A further object of the invention is to provide improved locking means which are quick and automatic in operation and which automatically compensate for any wear in the parts. A still further object of the invention is to provide a mold in which the steam connection to the movable mold parts will be as little as possible affected by wear.

Referring to the drawings,

Fig. 6 is a section on line 6—6 of Fig. 2;

Fig. 7 is a section through the assembled mold showing a tube in place;

Fig. 8 is a section on line 8—8 of Fig. 1;

Fig. 9 is a back elevation of the mold showing the mold section open;

Fig. 10 is a section on line 10—10 of Fig. 8;

Figure 1:
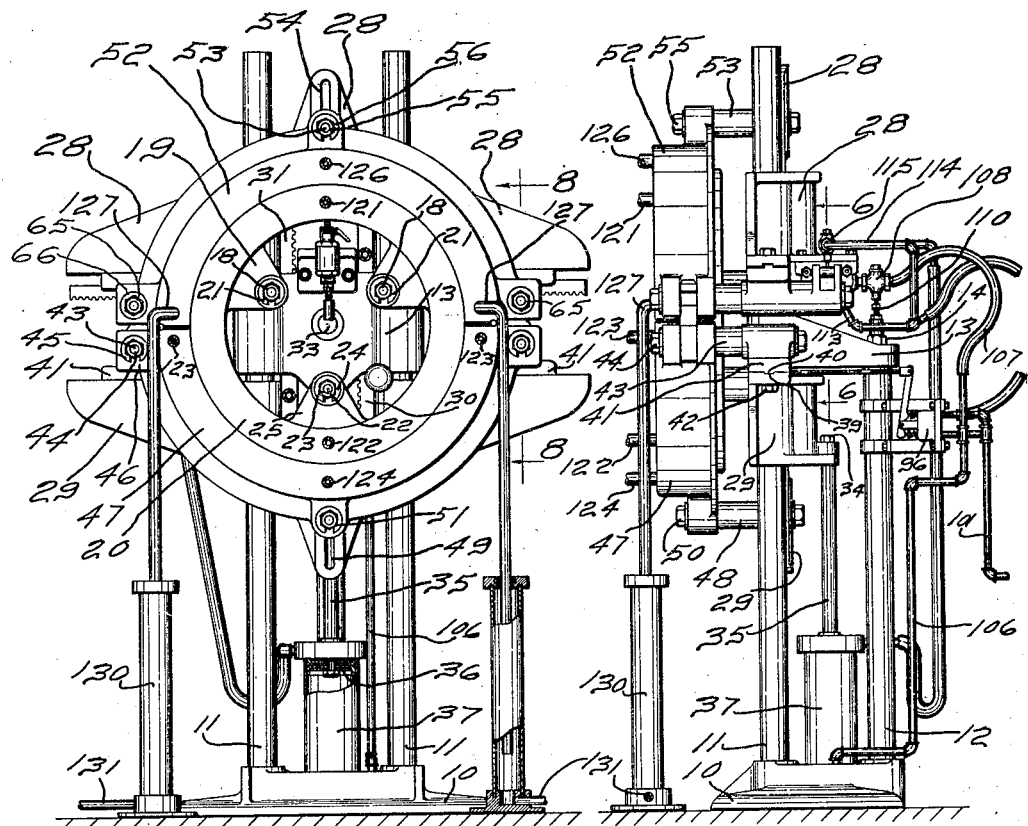
Fig. 1 is a front elevation of a vulcanizer constructed in accordance with my invention.

The mold and its actuating mechanism is carried upon a base 10. From this base rise two posts 11 and back of these a shorter post 12. A central head 13 is carried upon all three of these posts. The rear portion of the head is mounted upon a reduced portion of the post 12, being secured in that position by a nut 14 best shown in Fig. 2. The head is held to each of the posts 11 by an arrangement illustrated in section in Fig. 4. Rods 15 and 16, formed at their ends to partially embrace one of the posts 11, are drawn together by a screw 17. This not only binds the head 13 firmly to the posts 11 but secures in position the rods 15 which serve to secure the central portion of the mold in place. For this purpose the front end of each of the rods 15 is threaded and bears a nut 18 of a size to pass freely through a hole in an inwardly extending lug 19 formed upon the inner circular mold section 20. A slotted collar 21, interposed between the nut 18 and the lugs 19, serves to give a bearing surface for the nut so that the mold section may be firmly clamped in place. A rod 22, likewise secured to the head 13, carries a nut 23 which, by means of a slotted collar 24, secures in place the lug 25 extending upwardly from the bottom portion of the central mold section. By loosening the nuts 18 and 23 and removing the slotted collars, the central mold section may be pulled off without disturbing the mechanism for operating the mold. The central portion 20 of the mold is annular in form with a molding cavity 27 lying in its outer surface, the cavity being continuous throughout the circumference of the mold.

Slidably mounted upon the posts 11 are an upper head 28 and a lower head 29 movable vertically by means to be described so that they approach or recede from the central mold section. The upper head has a rack 30 attached to it and the lower head a similar rack 31, the two racks meshing with opposite sides of a pinion 32 carried upon a stub shaft 33 mounted on the central head 13. The racks and the pinion serve to couple the two heads together for vertical movement in opposite directions so that the weight of one counterbalances the weight of the other.

Coupled to the lower head 29 by a nut 34 operating upon a reduced portion thereof is a piston rod 35 bearing at its lower end a piston 36 running in a pneumatic cylinder 37. The air connections to this pneumatic cylinder, by means of which the piston is urged either up or down, will be described later. As the lower mold half is raised the upper head will be caused to descend by means of the rack and pinion connection previously described. Thus this rack and pinion connection not only serves to counterbalance the sections but to provide for their simultaneous movement into closed or open position.

Horizontal surfaces 38 formed on the lower head 29 are provided with slots 39 in which run a rib 40 of a block 41 secured in adjusted position by bolts 42. Mounted in each of these blocks is a stud 43 bearing at its outer end a nut 44 which through a notched collar 45 bears against a bifurcated lug 46 upon the lower outer mold half 47. At the lower portion of the head 29 is a stud 48 secured in adjusted position in a slot 49, in order to accommodate itself to different sizes of molds, this stud bearing at its outer end a nut 50 and a slotted collar 51 which function as in the cases above to secure the lower mold half in position. The upper mold half is held partly by a stud 53 secured adjustably in a slot 54 upon the upper head 28 and bearing a nut 55 and a slotted collar 56 as in the cases previously mentioned.

Studs 57, which also support the upper mold half, are secured by nuts 58 and collars 59 to blocks 60. Each of these blocks has a rib 61 running in a slot 62 formed in the horizontal portion of the upper head 28 and is secured in position by bolts 63. These studs are free to rotate in the block and are also free to rotate in bifurcated lugs 64 which extend from the sides of the upper mold section. Nuts 65, mounted upon a reduced end of the studs and bearing against the lugs 64 through a collar 66, which in this instance is not slotted, serve to secure the upper mold section 52 in place.

Through these rotatable studs 57 the locking of the mold sections after they have been assembled around the central section is accomplished. To each side of the lower section 29 is secured a locking member 67 (Fig. 10) held in place upon one of the studs 43. Its upper end is cut away upon the center line of studs 43 and 57 as at 68 and is formed with a circular cut 69 slightly off center with relation to the stud 57. This stud is formed at a point adjacent the cut 69 with an eccentric half circle 70 which, when rotated into the full line position of Fig. 10, exerts a pressure forcing the member 67 upwardly and therefore locking the two heads 28 and 29 firmly together.

In order to rotate the studs 57 the rear end of each of them is formed with a pinion 71 meshing with a rack 72 slidably mounted in the adjacent block 60 and having roller guides 73 bearing upon its upper surface in order to keep it in correct registration with the pinion. Secured to each rack is a piston rod 74 (Fig. 6) bearing a piston 75 running in one side of a double cylinder 76, the air connections to which will be described below. When the pistons are forced apart they cause the pinion 71 to be rotated in a direction to lock the mold. When they are drawn back toward the central position they rotate the eccentric half circle 70 to positions where they will clear the cut away surfaces 68 and therefore permit the mold to separate. In the position shown in Fig. 6 the pistons are at their outer limit of travel as permitted by the locking members but it will be noticed that they have not reached the outer end of the cylinder. This additional motion is provided so that if the locking members wear the outward stroke of the piston will automatically take up the wear without the necessity for any adjustment.

In vulcanizing an inner tube it is necessary to inflate the tube by air or other fluid pressure supplied through the valve stem 77. In the present invention a very speedy mechanism is provided which serves both for admitting air through the valve stem and for drawing the stem downwardly at the same time in order to cause the tube to be seated firmly against the central mold half at a point adjacent the valve. The device for gripping the valve stem is shown in detail in Fig. 5. Mounted upon the central head 13 is a plate 78 to which is secured a boss 79. A barrel 80 extends freely through this boss and is secured in adjusted position therein by nuts 81. A plunger 82 runs freely through the center of the barrel and has a hole 83 extending completely through it whereby the tube valve 77 is connected to an air pipe 84. A spring 85 compressed between an enlargement 86 on the plunger and a threaded sleeve 87 secured in one end of the barrel constantly urges the plunger upwardly so that its tapered top 88, or any other suitable packing means, bears tightly against the end of the valve stem. Jaws 89 are pivoted at 90 to the upper end of the barrel 80 and bear teeth 91 which grip the screw threads on the end of the valve stem. Clamp bars 92 are riveted to one of the jaws and carry an eccentric 93 bearing against the outer surface of the other jaw, this eccentric carrying a lever 94 by means of which it can be operated. A pin and slot connection 95 prevents the eccentric from becoming displaced beyond the position necessary for disengaging it from the jaws.

Figure 11:
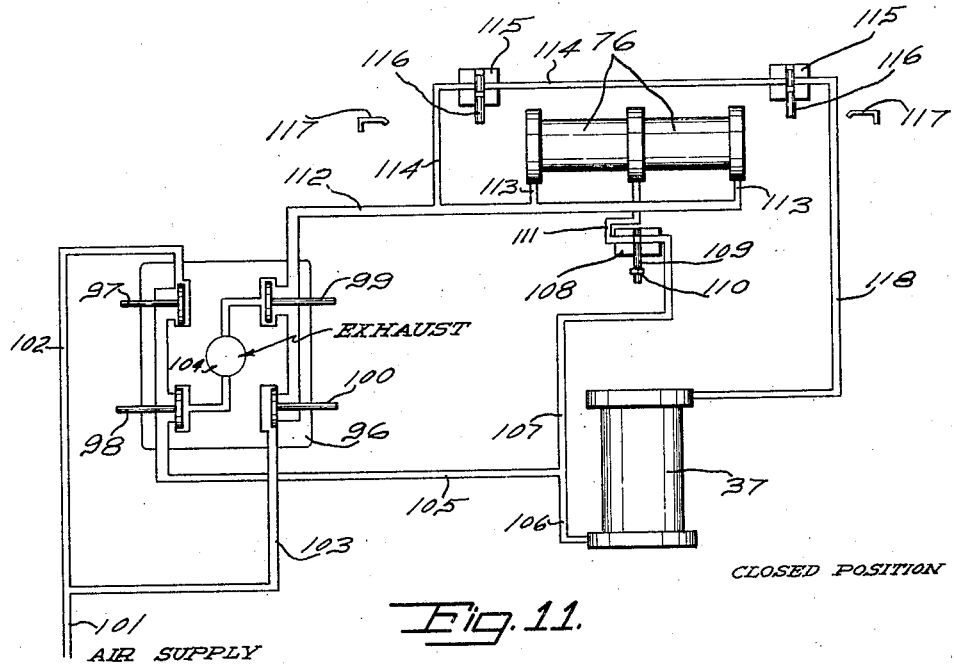
Fig. 11 is a diagrammatic view showing the arrangement of air pipe and control valve with the parts in the position they occupy when the mold is closed.
Figure 12:
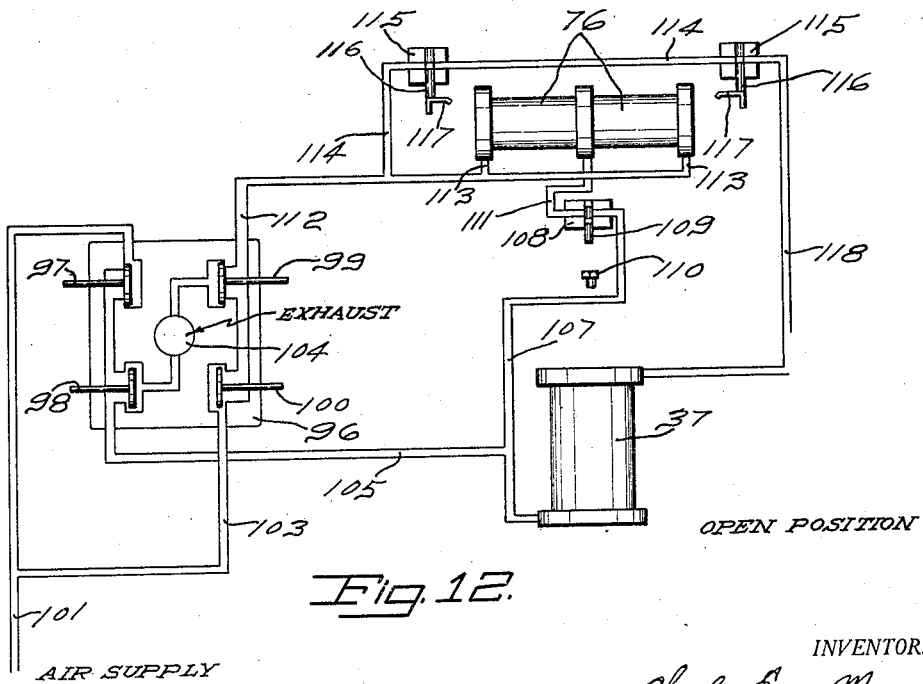
Fig. 12 is a similar view showing the position of the parts when the mold is open.

The admission of air under pressure to the pneumatic cylinders thus far described is under the control of a main valve 96, the connections to which are illustrated in detail in Figs. 11 and 12. The valve is composed of plungers 97, 98, 99, and 100, which have been shown conventionally only in the drawings, as the valve is of a standard commercial type. Plungers 97 and 99, and 98 and 100 are connected so that they operate in pairs, the two pairs being simultaneously actuated in opposite directions. Thus, when valves 97 and 99 are opened valves 98 and 100 are closed and vice versa. Leading to the valve is an air supply pipe 101 having branches 102 and 103 leading respectively to the plungers 97 and 100. An exhaust 104 is connected to each of valves 98 and 99. It will be noted that valves 97 and 98 are connected by an air passage, as are valves 99 and 100.

Leading from the plunger 98 is a pipe 105 having a branch 106 extending to the bottom of cylinder 37 and a pipe 107 passing through a valve 108. This valve contains a plunger 109 which is actuated by an abutment 110 shown in Fig. 2 as mounted on the upper end of post 12. Valve 108 itself is carried upon the upper support 28 so that when the latter descends the plunger 109 strikes the abutment and opens the valve as shown in Fig. 11. With this valve open connection is made through a pipe 111 to the central portion of cylinder 76 which, it will be remembered, was double in construction. Leading from the plunger 99 is a pipe 112 having branches 113 extending to the ends of cylinder 76 and a branch 114 leading through two valves 115 which are arranged in series. These valves contain plungers 116 which are actuated by abutments 117 which are, as shown in Fig. 6, mounted upon the rack 72. When the racks are in locking position, as shown in Figs. 6 and 11, the valves 115 are closed. When, however, the pistons 75 move toward each other to unlock the mold sections the abutments 117 cause the valves 115 to open, thus freeing a passage through pipe 114 to a pipe 118 at the top of the cylinder 37.

The operation of this valve mechanism will now be briefly considered. Assuming the molds to be closed as in Fig. 11, it will be observed that air is being admitted through pipe 102 and pipe 105 to the bottom of cylinder 37, thus urging the piston running in this latter cylinder upwardly and holding the molds closed. Air from the branch 103 is shut off by plunger 100 thus keeping the air pressure from acting either upon the upper side of the cylinder 37 or upon the outer ends of the cylinders 76. By means of the abutment 110 the valve 108 is opened and air is thus admitted through the branch 107 to force the pistons 75 outwardly into locking position. After the vulcanization of the tube is complete the valves are changed in position, plungers 97 and 99 being moved to closed position and plungers 98 and 100 to open position as indicated in Fig. 12. This shuts off the supply of air through pipe 102 and opens the supply through pipe 103 to the ends of cylinders 76. As the pistons 75 move inwardly the abutments 117 are brought under the plungers 116 as shown in Fig. 12, thus opening a passage for air through pipe 114 to pipe 118 at the top of the cylinder 37. The bottom of this cylinder is, through pipe 105 and plunger 98, vented to the exhaust 104, and the pipe 111 is initially vented through the same channel so as to relieve the pressure in the center portion of cylinder 76. After the upper mold section begins to rise, however, the plunger 109 leaves the abutment 110 and closes the valve 108.

The purpose of valves 108 and 115 is to give an automatic interlocking action which will prevent any exertion of force in a direction to open the mold while the locking mechanism is in place, and conversely to prevent the actuation of the locking mechanism before the mold has been completely closed. By this means breaking of the parts due to improper operation is made impossible.

Figures 2, 3, 4, 5:
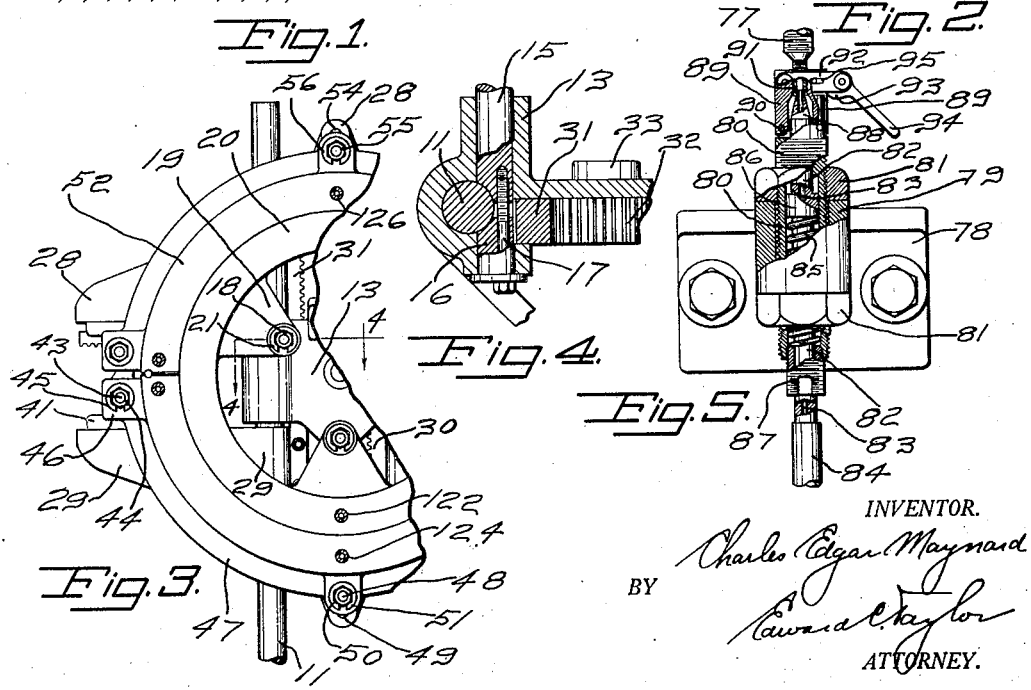
Fig. 2 is a side elevation thereof.
Fig. 3 is a partial front elevation corresponding to Fig. 1, but showing a different size of mold in place.
Fig. 4 is a detail section on line 4—4 of Fig. 3.
Fig. 5 is an enlarged view with certain parts broken away showing the mechanism for gripping the valve stem of the tube to be vulcanized and for supplying air under pressure thereto.

Referring now to the internal construction of the mold sections and their steam connections, as illustrated in Figs. 1, 2, and 7, the circular inner section 20 is cored as at 120 to provide a continuous annular chamber for steam circulation. A steam inlet 121, as shown in Figs. 1 and 2, and a steam outlet 122 are provided whereby the central section 20 may be constantly heated. The lower semi-circular outer section 47 is also cored out for circulation although this does not appear in the drawings, and is provided with steam inlets 123 at its upper corners and with a steam outlet 124 at its lower mid-point. The upper section 52 is cored as at 125 (Fig. 7) and has an inlet 126 at its upper mid-point and steam outlet 127 at its lower corners. It will be observed that in each case the inlet is at the upper portion of the mold section and the steam outlet at the lowermost point so that water of condensation will be automatically removed. Furthermore, the lowermost points of the mold section at which the steam outlets are placed do not vary their position relative to the remainder of the mold section whether the mold is opened or closed. This insures that the steam circulation will remain constant both when the mold is in use and when it is temporarily inactive, so that no cold spots in the mold section will occur.

The steam outlets 127 of the upper section have been shown as connected through a pipe 128 passing through a stuffing box 129 in a chamber 130. This forms a sliding steam tight connection which permits the supply of steam at all times irrespective of the vertical position of the mold section. A steam pipe 131 leads into the chamber 130 to supply the steam. The other steam connection may be made by similar sliding joints or by flexible or swivel connections. The sliding joint described is perhaps the most permanent form of connection, and is for that reason preferred.

Registration of the mold sections when the mold is closed is accomplished by the interengagement of grooves 132 on the central section with ribs 133 upon the two outer sections as shown in Fig. 7. These grooves and ribs extend throughout the circumference of the section and are preferably made beveled, as illustrated in Fig. 7, in order to facilitate the closing of the sections upon each other. In order to permit the registration of the sections to be regulated only by these ribs and grooves, the holes in the mold sections through which the studs 43, 57, etc., pass are made slightly larger than the studs so that the mold is free to move upon the carrying support when it comes in contact with the central section and the opposed outer section. After the mold has been closed a few times the various sections take up a constant position which is more accurate than could be produced by any manual fitting together of the parts. In order to strengthen the mold sections and to prevent any bending on account of the steam pressure within the heating chamber or the air pressure within the tube one or more strengthening ribs 134 are preferably formed upon the outer mold section.

With the mold opened as in Fig. 9, which it will be remembered is a back view, the tube 135 may be placed around the central section 20. The tube is put in place with the valve stem 77 uppermost and extending downwardly through a hole in the molding surface of the central mold section. The valve is pushed down firmly and its end clamped by depressing the lever 94 shown in Fig. 5. The operating handle 136 of the main valve 96 is then actuated to place the valve in the condition shown in Fig. 11. The cylinder 37 will then cause the lower mold section to rise and the rack and pinion connection between the two sections will cause the upper section to be lowered simultaneously. When the upper section reaches its lowermost position the plunger 109 comes in contact with abutment 110 and through valve 108 admits air to the central portion of cylinder 76, thus rotating the studs 57 and locking the mold firmly together. At the termination of the cure the handle 136 is again actuated and the main valve placed in the condition of Fig. 12. As previously described this vents the bottom of cylinder 37 and the central portion of cylinder 76 and admits air first to the outer ends of cylinder 76 and then, after the valves 115 have been opened, to the top of cylinder 37. The mold is thus again opened and after releasing the clamping lever 94 the vulcanized tube may be removed.

Having thus described my invention, I claim:

1. A mold for vulcanizing annular articles comprising a circular central section, a pair of semi-circular outer sections, means for moving the semi-circular sections in diametrically opposite directions, and means automatically operable upon the closing of the mold for locking the sections in assembled relation.

2. A mold for vulcanizing annular articles comprising a circular central section, a pair of semi-circular outer sections parted upon a horizontal plane, a connection between the outer sections whereby their weights are caused to counterbalance each other, and means for moving the outer sections vertically in opposite directions.

3. A mold for vulcanizing annular articles comprising a circular central section, a pair of semi-circular outer sections parted upon a horizontal plane, means for moving the sections vertically in diametrically opposite directions, and automatic means for locking the mold sections together as the mold is closed.

4. A mold for vulcanizing annular articles comprising a circular central section, a pair of semi-circular outer sections, means for moving the outer sections into or out of registration with the central section, and automatic means for locking the mold sections together as the mold is closed and unlocking said sections as the mold is opened.

5. A mold for vulcanizing annular articles comprising a circular central section, a pair of semi-circular outer sections, vertical guides located at diametrically opposite sides of the central sections, bearings on each end of each of the outer sections interfitting with the guides, a pair of vertical racks one secured to each of the outer sections, and a stationary pinion meshing with both of the racks whereby the weights of the two outer sections counterbalance each other.

6. A mold for vulcanizing annular articles comprising a circular central section, a pair of semi-circular outer sections parting along a horizontal plane and interiorly cored to permit the circulation of steam therein, means for moving the outer sections vertically in diametrically opposite directions, and steam connections leading from each end of each outer section and also from the midpoint thereof, the connections from the ends of the upper section and from the mid-point of the lower section being the outlets, whereby drainage of water of condensation is permitted in all positions of the sections.

7. A mold for vulcanizing annular articles comprising a circular central section and a pair of semi-circular outer sections, a locking member having a substantially semi-circular groove located at each end of one of the outer sections, and a rotatable eccentric secured at each end of the other outer section, formed to pass by the corresponding locking member when in one position and to force the outer mold sections together when rotated.

8. A mold for vulcanizing annular articles comprising a circular central section and a pair of semi-circular outer sections, a locking member having a substantially semi-circular groove located at each end of one of the outer sections, a rotatable eccentric secured at each end of the other outer section, formed to pass by the corresponding locking member when in one position and to force the outer mold sections together when rotated, and means for rotating the eccentrics simultaneously.

9. A mold for vulcanizing annular articles comprising a circular central section and a pair of semi-circular outer sections, a locking member having a substantially semi-circular groove located at each end of one of the outer sections, a rotatable eccentric secured at each end of the other outer section, formed to pass by the corresponding locking member when in one position and to force the outer mold sections together when rotated, and means actuated by the closing of the molds for rotating the eccentrics into locking position.

10. A mold for vulcanizing annular articles comprising a circular central section, a pair of semi-circular outer sections, means for moving the outer sections into and out of registration with the central section, locking means for the outer sections having a continuous wedging action whereby wear is automatically accommodated, and means for actuating the locking means automatically upon the closing of the mold.

11. A mold for vulcanizing annular articles comprising a central support, a pair of supports movable towards and from the central support in diametrically opposite directions, a circular molding section detachably secured to the central support, and a pair of semi-circular outer sections one detachably secured to each of the movable supports.

12. A mold for vulcanizing annular articles comprising a central support, a pair of supports movable towards and from the central support in diametrically opposite directions, a circular molding section detachably secured to the central support and chambered to permit the circulation of steam, and a pair of semi-circular outer sections one detachably secured to each of the movable supports, each of the outer sections being chambered to permit the circulation of steam, the molding sections all being removable from their respective supports without unsealing their steam chambers.

13. A mold for vulcanizing inner tubes comprising a central circular section provided with a hole to receive a valve stem, outer sections forming with the central section a complete annular molding cavity, means for moving the outer sections towards and from the central section, and quick-acting means supported in a predetermined fixed position exterior to the mold for gripping and holding the free end of a valve stem when the latter is projected through the hole in the central section.

14. A mold for vulcanizing annular articles comprising a central circular section, a pair of semi-circular outer sections parted upon a horizontal plane, means for moving the outer sections vertically into or out of contact with the central section, and steam connections to the outer sections embodying a pipe sliding in a sleeve but having a constant fluid tight connection therewith.

15. A mold for vulcanizing annular articles comprising two separable mold sections, a locking member having a substantially semi-circular groove associated with one of the sections, a rotatable eccentric associated with the other sections, formed to pass by the locking member when in one position and to force the mold sections together when rotated, and means for rotating the eccentrics into locking position.

CHARLES E. MAYNARD.